United States Patent [19]

Scheibel et al.

[11] 3,953,699

[45] Apr. 27, 1976

[54] FASTENING ARRANGEMENT FOR THE SWITCHING MECHANISM CAGE OF AN ELECTRIC SWITCHING APPARATUS

[75] Inventors: Karl-Heinz Scheibel; Nikolaus Miheilowitsch; Heinz Goerndt, all of Amberg, Germany

[73] Assignee: Siemens Aktiengesellschaft, Munich, Germany

[22] Filed: Sept. 12, 1974

[21] Appl. No.: 505,385

[30] Foreign Application Priority Data
Sept. 13, 1973 Germany............................ 2346210

[52] U.S. Cl............................... 200/295; 200/293; 200/340; 174/53; 317/112
[51] Int. Cl.²......................................... H02B 1/03
[58] Field of Search........ 200/5 A, 159 R, 293–296, 200/340; 248/27, DIG. 6; 174/53, 58; 317/99, 101 CB, 112, 120

[56] References Cited
UNITED STATES PATENTS

| | | |
|---|---|---|
| 3,335,900 | 8/1967 | Mackiewicz.......................... 174/53 |
| 3,626,133 | 12/1971 | Teruzzi............................... 200/295 |
| 3,727,020 | 4/1973 | Bailey................................. 200/295 |
| 3,814,928 | 6/1974 | Grosseau.............................. 248/27 |

*Primary Examiner*—Gerald P. Tolin
*Attorney, Agent, or Firm*—Kenyon & Kenyon Reilly Carr & Chapin

[57] ABSTRACT

An electric switching apparatus of the type including a base fabricated of electrical insulation material and a switching mechanism cage which includes at least two side plates. Outwardly extending projection members are disposed at opposite ends of at least one edge of each of the side plates, and each include a hook portion at the end thereof which extends outwardly from the lateral edges of the plates. The apparatus base includes recesses extending therethrough which receive the projection members, and the hook portions project therefrom when the projection members are disposed in the recesses. Spring clips are disposed between the hook portions of the plate projection members and the apparatus base for fastening the cage side plates to the base.

8 Claims, 4 Drawing Figures

3,953,699

FASTENING ARRANGEMENT FOR THE SWITCHING MECHANISM CAGE OF AN ELECTRIC SWITCHING APPARATUS

BACKGROUND OF THE INVENTION

1. Field of the Invention

This invention relates to an improved arrangement for fastening the side plates of a switching mechanism cage to the insulated base of an electric switching apparatus.

2. Description of the Prior Art

Generally speaking, the side plates of the switching mechanism cages of electric switching apparatus are riveted to each other by means of spacers, and are interconnected by a fastening screw connection and threaded sheet metal components (which are disposed between the side plates and include projections which protrude through cut-outs from the side plates in a direction transverse to the longitudinal axes thereof) to the base of the apparatus. Such prior art assemblies are, however, generally complex, expensive to fabricate, and are subject to shrinkage at the apparatus base which is not compensated for.

SUMMARY OF THE INVENTION

It is therefore an object of the invention to provide an improved mounting structure for the switching mechanism cage of an electric switching apparatus and to overcome the aforementioned disadvantages of prior art devices.

It is also an object of the invention to provide a simplified and inexpensive mounting structure for such apparatus which compensates for the above-described base shrinkage.

These and other objects are achieved by the invention in an electric switching apparatus of the type including a base fabricated of electrical insulation material and a switching mechanism cage including at least two side plates. The improvement of the invention comprises, outwardly extending projection members disposed at opposite ends of at least one edge of each of the side plates, and each including a hook portion at the end thereof, extending outwardly from the lateral edges of the plates. The apparatus base includes recesses extending therethrough which receive the projection members, and the hook portions of the projection members project from the base when the members are disposed therein. Spring means, such as resilient spring clips, are disposed between the base and the hook portions of the projection members for fastening the plates to the base.

These and other novel features of the inventive apparatus will be described in further detail in the following detailed description.

DETAILED DESCRIPTION

Figure 1:
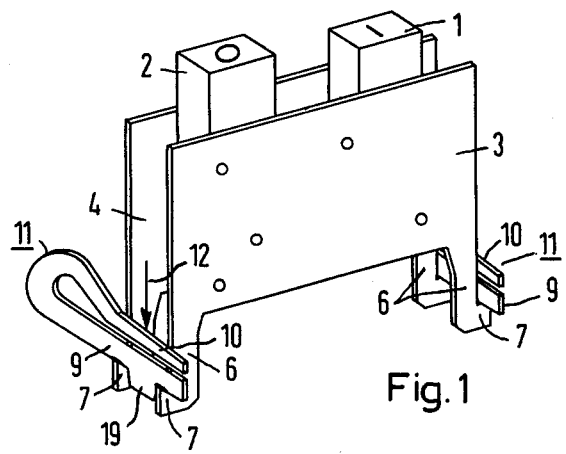
FIG. 1 is a perspective view of the improved fastening arrangement of the invention shown with the insulated base and switching mechanism cage of the apparatus removed.
Figures 3, 4:
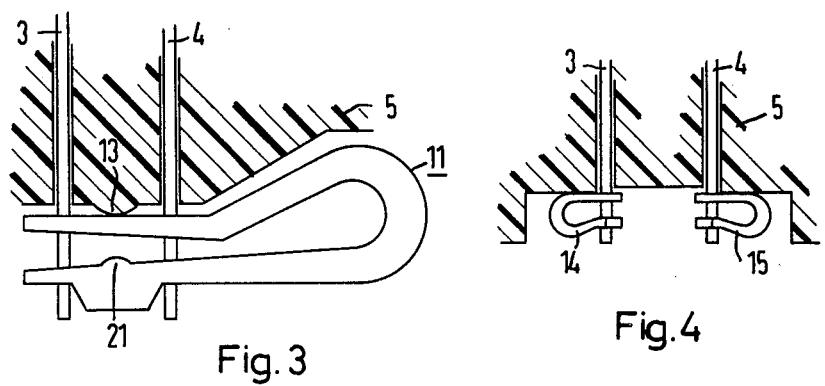
FIG. 3 is a partial side view of the side plates, switching mechanism cage and spring clips of the inventive arrangement.
FIG. 4 is a partial side view of another embodiment of a fastening arrangement constructed according to the invention.

Referring now to the drawings, there is shown a switching mechanism cage which includes actuating buttons 1 and 2 disposed between two side plates 3 and 4 thereof. Neither the switching mechanism cage elements, which act upon the electric switch, nor the electric switching apparatus, are shown. In order to fasten the switching mechanism cage to insulated apparatus base 5, side plates 3 and 4 are provided with projection members 6 which include hook portions 7. The hook portions 7 protrude laterally beyond the lateral edges of the side plates and have an undercut edge 8, which engages one leg 9 of a spring clip 11. The other leg 10 of spring clip 11 engages apparatus base 5, as shown schematically in FIG. 1 by arrow 12. As shown in FIG. 3, the contact point of leg 10 with base 5 is designated by the reference symbol 13. Leg 9 engages the hook portions 7 of both side plates 3 and 4 so that in conjunction with the contact point 13, an equilateral triangle is formed by the contact points of each spring clip.

It is particularly advantageous if the contact points between the side plate projection members, the apparatus base and the spring clips form, as described above, the corners of an equilateral triangle. Such an arrangement provides a compact, elastic fastening connection between the base and side plates. As a result, the switching mechanism will always spring back into its original position when acted upon by a transversely directed force. Damage to the mechanism thereby is avoided. Moreover, since spring clips are utilized, it is easier to provide the spring forces required. Threading of the spring clips through the side plate projection members is also unnecessary, thereby further simplifying the assembly of the apparatus, when hook portions are provided on the side plates which engage the spring clips in a direction which is transverse with respect to the longitudinal axes of the side plates. Undercutting the hook portions also assure that the spring clips do not slip laterally. Improved accessibility for assembling the spring clips is provided by orientating the hook portions towards the side surfaces of the apparatus base; improved protection of the spring clips against outside forces is achieved with practically the same space requirements by locating the contact points in a lateral recess in the apparatus base; and overloading of the spring clips during assembly is achieved by providing a stop for limiting the travel of the spring clip legs.

Another embodiment of the fastening arrangement is shown in FIG. 4. This arrangement uses two spring clips 14 and 15 of identical design, each of which engages only one of side plates 3 and 4. Such an arrangement may be utilized whenever space requirements prohibit the use of a long spring clip.

Figure 2:
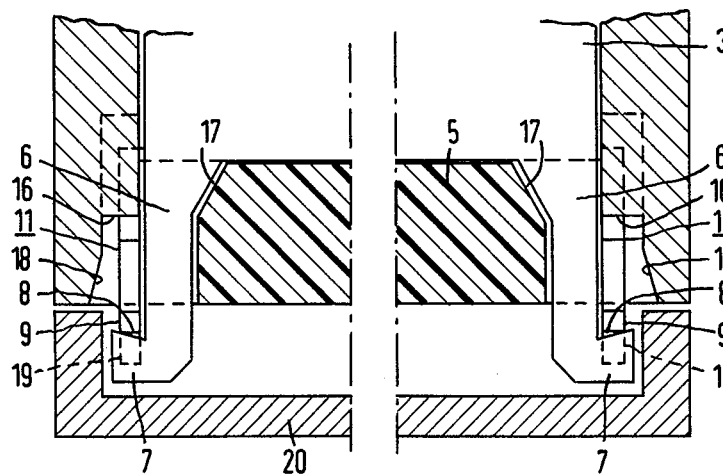
FIG. 2 is a cross-sectional view of the fastening arrangement, switching mechanism cage, and insulated base of a switching apparatus constructed in accordance with the invention.

The insertion of the spring clips to fasten the plates may be done mechanically from the outside of base 5. Such assembly is simple since the spring clips can be compressed outside the base and inserted into the recess therein before engaging hook portions 7. As shown in FIG. 2, leg 10 of clips 11 may also be inserted into recess 16 in base 5 in which a contact point 13 is located, and then flexed by means of an appropriate tool behind hook portions 7 after projection members 6 of the side plates are inserted in recesses 17 of base 5. Spring clips 11 are preferably kept in recess 18 of recess 16 during assembly in order to simplify tool manipulation. Lateral shifting of spring clips 11 is prevented by means of a downwardly extending member 19 which slides between hook portions of the plates 7. Recess 16 is preferably positioned so that it may be enclosed, such as, for example, by a bottom cover 20 affixed to base 5. The described fastening arrangement of the invention provides a relatively narrow width switching mechanism cage but does not interfere with mechanical assembly of the switching apparatus.

In the foregoing specification, the invention has been described with reference to specific exemplary embodiments thereof. It will, however, be evident, that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. In an electric switch comprising a base fabricated of electrical insulation material and a switching mechanism cage including at least two side plates fastened to said base, the improvement comprising outwardly extending projection members, disposed at opposite ends of at least one edge of each of said side plates, and each including a hook portion at the end thereof extending outwardly from the lateral edges of said plates, said base including recesses extending therethrough receiving said projection members and said hook portions projecting from said base, and further comprising spring means, disposed between said base and said hook portions of said projection members, fastening said plates to said base.

2. The apparatus recited in claim 1, wherein said plates, and said projection members and hook portions thereof, are disposed in parallel relationship, and said spring means engages said hook portions of both of said plates at one end thereof, said spring means also engaging said base at a contact point between said plates so that said contact points between said base and said spring means and said plates and said spring means, respectively, form the corners of an equilateral triangle.

3. The apparatus recited in claim 2, wherein said spring means comprise spring clips.

4. The apparatus recited in claim 3, wherein said projection members and hook portions are integrally formed with said side plates and are disposed in the same plane therewith, and wherein said spring clips are disposed between said base and said hook portions in a position which is transverse to the longitudinal axes of said side plates.

5. The apparatus recited in claim 4, wherein the edges of said hook portions in engagement with said spring clips are inclined upwardly and outwardly from said side plates at an angle of about 10° with respect to the plane of said base.

6. The apparatus recited in claim 4, wherein said base further comprises lateral recesses disposed adjacent said plates receiving said spring clips therein.

7. The apparatus recited in claim 4, wherein said spring clips each further comprise a downwardly extending member interposed between said hook portions of said projection members.

8. The apparatus recited in claim 7, wherein said spring clips are of curved configuration and include a pair of leg portions disposed in approximate parallel relationship, at least one of said leg portions including an abutment member disposed on an inner edge thereof between said leg portions for limiting the inward movement thereof.

* * * * *